United States Patent
Blair

(10) Patent No.: US 6,839,324 B1
(45) Date of Patent: Jan. 4, 2005

(54) METHOD AND APPARATUS PROVIDING DIAL ON DEMAND SCALING

(75) Inventor: Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/281,591

(22) Filed: Mar. 30, 1999

(51) Int. Cl.$^7$ .............................................. G01R 31/08
(52) U.S. Cl. ....................... 370/237; 370/356; 370/352
(58) Field of Search ................................ 370/389, 352, 370/353, 354, 356, 400, 401, 235, 237; 709/238, 239, 225; 713/155, 201; 379/142.04, 142.05

(56) References Cited

U.S. PATENT DOCUMENTS

| | | | |
|---|---|---|---|
| 5,918,019 A * | 6/1999 | Valencia ..................... 709/227 |
| 6,073,176 A | 6/2000 | Baindur et al. | |
| 6,081,518 A | 6/2000 | Bowman-Amuah | |
| 6,141,687 A | 10/2000 | Blair | |
| 6,144,727 A | 11/2000 | Mashinsky | |
| 6,147,987 A * | 11/2000 | Chau et al. ................. 370/352 |
| 6,215,776 B1 | 4/2001 | Chao | |
| 6,219,790 B1 * | 4/2001 | Lloyd et al. ................ 713/201 |
| 6,233,232 B1 * | 5/2001 | Chau et al. ................. 370/351 |
| 6,278,705 B1 * | 8/2001 | Chau et al. ................. 370/338 |
| 6,282,281 B1 | 8/2001 | Low | |
| 6,295,292 B1 | 9/2001 | Voit et al. | |
| 6,298,383 B1 * | 10/2001 | Gutman et al. ............. 709/229 |
| 6,526,444 B1 | 2/2003 | Blair | |
| 6,738,824 B1 | 5/2004 | Blair | |

* cited by examiner

*Primary Examiner*—Bob Phunkulh
(74) *Attorney, Agent, or Firm*—Hamilton, Brook, Smith & Reynolds, P.C.

(57) ABSTRACT

A method and apparatus providing improved service in IP networks requiring switch circuit connections by allowing many local systems to establish a switched circuit connection to a remote system without using equal cost routing. The invention detects when a system is over-subscribed (no circuits available for dial-out), congested (lacking other resources to provide dial-out), or more band-width is demanded, and scales to the demand by forcing dial-out from an alternative system. Existence of the new connection is made available to existing systems by updates to system routing tables. The scaling capability is also used to address incoming calls that require a callback from the most appropriate system.

17 Claims, 5 Drawing Sheets

METHOD AND APPARATUS PROVIDING DIAL ON DEMAND SCALING

BACKGROUND OF THE INVENTION

Computer networking uses various data communications techniques to transmit information from one computer to another over a network. A typical network includes a series of interconnected data communications devices that can each exchange data from one device to another, enabling the exchange of information. In a typical computer networking application, source and destination computer hosts are personal computers, workstations, clients and servers or the like which each include a modem or other transmitter that is used to establish a connection to the network and transmit the data from the computer.

Quite often, a portion of the data communications path upon which data travels between a source and destination computer host is comprised of a dial-up connection. Dial-up connections, as their name implies, do not always exist. Rather, they are created on an as-needed basis to create a data link between two data communications devices. Until the establishment of communications between the source and destination host exists, a dial-up connection may not be in existence for one or more segments of the network path used to transfer data.

For example, suppose a computer on the Internet begins to transmit packets of data that are destined for a remote host located in an isolated area. Further assume there is not permanent or dedicated connection to and from the remote host. On route to the destination host, the data packets are routed to a router on the Internet that is called an edge system. An edge system or edge router is typically a Network Access Server (NAS) that includes a number of IP network interfaces permanently coupled to the Internet, as well as a number of dial-in/dial-out interfaces allowing call connections to be placed (and received) over a circuit switched network such as a Public Switched Telephone System (PSTN). The edge NAS detects that the arriving data packets are destined for the remotely located host (via routing information in the packets) and initiates a dial-up connection to the remote host. Once the dial-up connection is established via modem communications between the remote host and the NAS, the data packets can be successfully transmitted (and received) to and from the remote host. When the communications session is ended by either one of the source or destination (i.e. remote) hosts, the dial-up connection between the NAS and the remote host is disconnected.

The above example is called "dial on demand routing" because the dial-up connections are made on an as-needed basis. In the above example and in this specification, the packet-based IP network (e.g., the Internet) which includes the edge NAS system is called the local network. The host to which the dial up connection is made may be a single host or may be an edge router or NAS on an entirely separate network and is called the remote host.

In an IP network such as the Internet, the routes which data packets take while traveling through the network from one device to another between a source and destination host are determined by various Internet Protocol (IP) routing protocols. IP routes which point from a local edge router system (e.g., the NAS above) to a remote host may be installed (i.e., configured within the devices on the network) by configuration or by dynamic routing mechanisms. Essentially, a route means that all IP data traffic originating on the local network is routed through the local edge system designated in the route. When the first packet of data arrives on this route, the edge system establishes the dial-up connection. The dial-up connection is made to a switched circuit network which can include circuit switched (e.g., PSTN, ISDN, T1 Signaling) and switch virtual circuit (i.e. X.25, ATM, L2TP) networks.

Conditions in the local network (i.e., the Internet) may occur which require more than one dial-up connection to be established to the remote host. For example, each dial-up connection requires the use of one port in the NAS. If there are many existing dial-up connections in use to various remote systems, there may be no ports left to establish a new dial-up connection that is required for packets arriving for a remote host not already connected. Alternatively, a situation may arise where a single existing dial-up connection to a remote host does not provide enough bandwidth for all of the data packets that must be sent and received by the remote host. If there are no more dial-out ports available on the NAS, the NAS is said to be congested or over-subscribed.

To avoid congestion there are two prior art mechanisms to allow multiple local systems (i.e., two or more NAS's) to connect to a single remote system. The two mechanisms are called "Equal Cost Routing" and "Unequal Cost Routing".

In Equal Cost Routing, multiple routes to the same remote host are established and are given an equal weighting in the routing protocol. A weight given to a route is used to determine which edge system receives a given packet for forwarding to the remote host. As packets are transferred through the network, they may be forwarded to one of many edge systems, each of which indicates the same weight, thus lessening the chance that any one edge system becomes overcrowded.

In Unequal Cost Routing, a priority is established between edge systems that can connect with a remote system. A lesser priority edge system is used to establish a dial-up connection if a higher priority edge system is not advertising its route(s) to the remote system. Route advertising is a mechanism by which a router can indicate to other routers the capability to provide a path to a specified system. In unequal cost routing, if a router is malfunctioning due to congestion or over subscription, the congested edge system can cease advertising it route. Packets for the remote system will then be routed to a lesser priority system which can then establish the dial-up connection to the remote system.

Another aspect of data communications related to dial-on-demand routing is called "bandwidth-on-demand." Bandwidth-on-demand in the prior art is known to work well for dial-in connections from remote systems to edge systems, but dial-out is only known to work well when all calls originate from the same edge server. Bandwidth-on-demand allows a remote system to detect that more bandwidth is required for one or more dial-in data communication sessions that are currently active. As such, bandwidth-on-demand provides the remote systems the ability to create an additional dial-in connection(s) to the edge system to satisfy the additional band-width requirements. The additional dial-in connection(s) off-load the bandwidth requirements from the existing heavily loaded connection(s). Bandwidth on demand is also referred to as a multi-link Point-To-Point (PPP) connection.

SUMMARY OF THE INVENTION

Prior art data communication systems that use dial-on-demand and bandwidth-on-demand schemes suffer from a variety of problems. Dial-on-demand systems that use equal cost routing can have situations where packets sent between the same source and destination host take different routes through the network and use different edge systems to connect with the same remote system. This results in an inefficient use of network resources since multiple dial-up connections must be established to the same remote host.

Moreover, since each packet may take a different route to the remote host, specialized queuing techniques for such things as quality of service are difficult or impossible to implement. In large networks, equal cost routing is difficult to implement since many calls to the same remote host may result.

Unequal cost dial-on-demand routing systems also suffer in a number of ways. If the remote system is heavily accessed, the high priority edge router is likely to become oversubscribed. Unequal cost routing does not redirect packets if the primary edge router is congested or oversubscribed. Rather, the packets sent to the high priority router are discarded. Once the route through the primary router is no longer advertised, only subsequently transmitted packets from the source will be picked up by the lower priority router. Thus, until the new connection is established, packet arrivals will continue to be sent to the high priority host and connection data will be lost.

There are no known bandwidth-on-demand systems that can provide dial-out features from more than one edge system, such as a Network Access Server. The present invention overcomes the aforementioned problems related to dial-on-demand and bandwidth-on-demand systems. The present invention provides.

An embodiment of the invention is an edge network access server providing scalable dial-on-demand routing of a network packet. The edge network access server containing a system processor, a system memory having a router for routing the network packet to alternate edge network access servers and a list of alternate edge network access servers, and a system bus connecting the system processor, and the system memory. Additionally, the edge network access server may contain dial communication ports for creating dial connections to a remote host system and local communication ports for interfacing to a local host system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
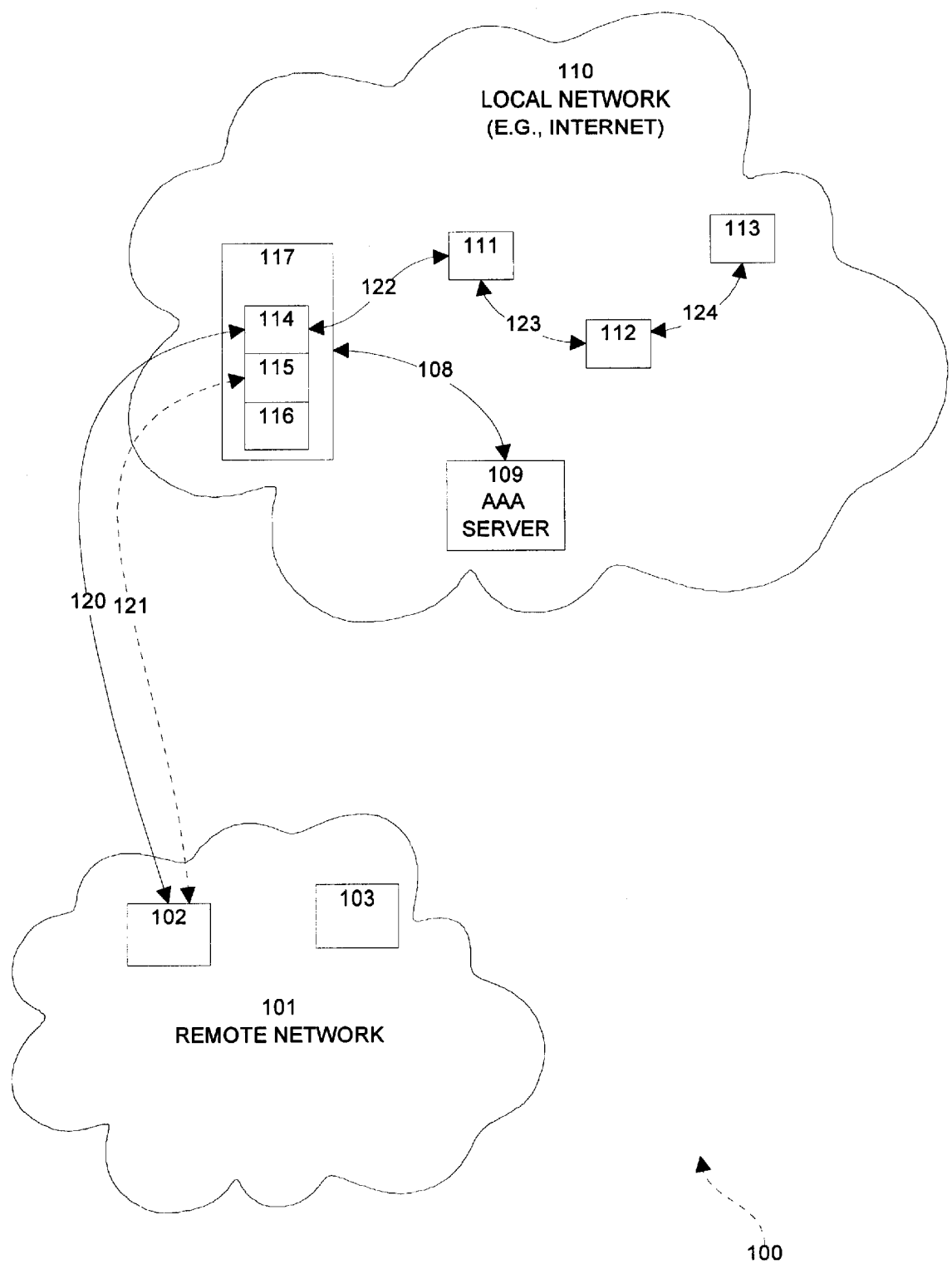
FIG. 1 illustrates a networking environment configured according to the present invention.

FIG. 1 illustrates an example of a data communications networking environment 100 configured according to the invention. The network environment 100 includes a local network 110 linking hosts 111 through 116 and a remote network 101 which interconnects remote hosts 102 and 103.

The remote network 101 may be any type of connectionless or packet-based network such as the Internet or a local area packet network maintained within a company, for example.

The local network 110 may be any type of connectionless or packet-based network such as the Internet or a local area packet network maintained within a company, for example. The local hosts 111 through 113 may be routers, bridges, switches, servers, hubs or simply standalone computer systems which can route data over links 122, 123 and 124 within local network 110. In this embodiment, local hosts 114 through 116 are called edge hosts and are preferably network access servers (NAS's) provided together in a stack group 117. The local hosts 114 through 116 in the stack group 117 serve as edge hosts on local network 110 and offer dial-on demand and bandwidth-on-demand features as defined by this invention. Edge hosts 114 through 116 each include interfaces (not specifically shown in this figure) to local hosts such as 111 through 113 on local network 110, as well as dial interfaces (not specifically shown) for maintaining connections with remote hosts such as 102 and 103 on remote network 101.

The remote hosts 102 and 103 each include a dial-in and/or dial-out connection mechanism (not shown in this figure) allowing dial-up connections to be maintained between other remote hosts and edge hosts 114 through 116.

According to this invention, each edge host 114 through 116 is equipped with the ability to provide scalable dial-on-demand routing. As an example, suppose local host 113 initiates the transmission of packets onto data link 124. Further suppose each packet has a destination address of remote host 102. The packets are routed from local host 113 over data link 124 to local host 112 and then over data link 123 to local host 111 and then over data link 122 to edge host 114. The path the packets take within local network 110 is determined according to the routing tables maintained in each local host 111 through 116.

According to the invention, when the packets arrive at edge host 114, the edge host 114 determines that they are destined for remote host 102, which must be reached using a dial-out connection. Edge host 114, however, may be congested with heavy amounts of data traffic, or may be oversubscribed in which case there are no dial-out ports available for further connections. In the system of the invention, edge host 114 can communicate and negotiate with another edge host, such as edge host 115, to establish a connection 121 to remote host 102. Through a signaling process which will be described in more detail, the edge host 115 is able to establish connection 121 with remote host 102 and is able to indicate the existence of connection 121 back to edge host 114. During the establishment of connection 121, packets arriving at edge host 114 for remote host 102 are buffered to prevent packet loss. Once the connection 121 is established, all packets for remote host 102 are re-routed to edge host 115 for further transmission to remote host 102.

It is to be understood that the initial connection 120 to remote host 102 may never have been created, or alternatively, connection 120 may exist at the onset of the congestion or over subscription conditions at edge host 114. That is, connection 120 may exist and be used to transfer some packets to remote host 102. Then, should edge host 114 become congested and require greater bandwidth, the process explained above can be used to in effect provide bandwidth-on-demand for dial-out purposes. That is, connection 121 may be established to off-load some of the high bandwidth conditions that can occur on edge host 114. The processing details of the system of this invention will now be explained in greater detail.

Figure 2:
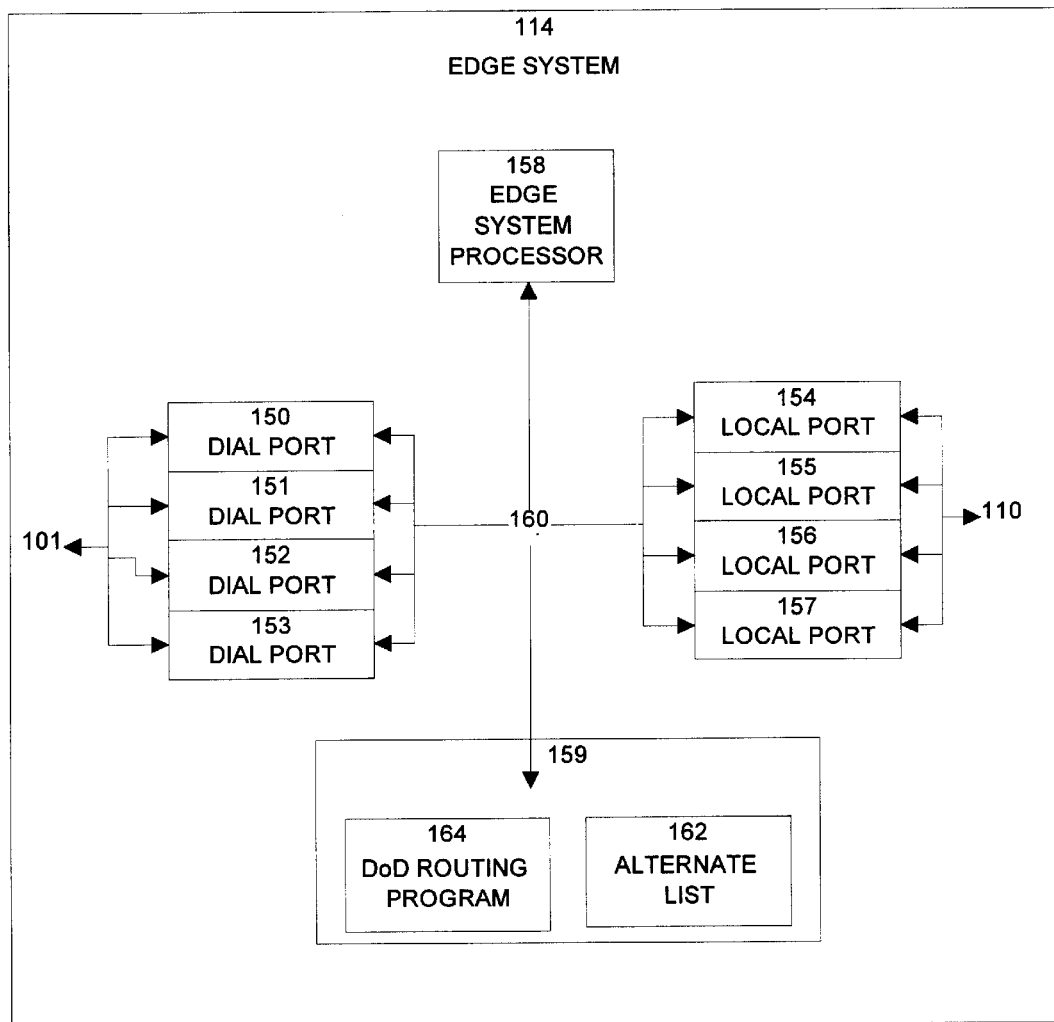
FIG. 2 illustrates the components that comprise an edge system such as an access server as configured according to the invention.

FIG. 2 illustrates a block diagram of the architecture of the edge system 114 as configured according to this invention. Edge system 114 includes a bus 160 which couples a processor 158, a memory 159, a plurality of dial ports 150–153 and a plurality of local ports 154–157. Local ports 154–157 can accept connections to and from local systems within local network 110 such as local systems 111–113. Dial ports 150–153 can place dial out connections and can accept dial in connections to and from remote systems such as remote systems 102 and 103 on remote network 101. The edge system processor 158 controls the overall operation of edge system 114 which generally serves as a router to transfer data between the various dial ports 150–153 and local ports 154–157. A dial-on-demand routing program 164 resides in memory 159 and executes in conjunction with processor 158 to perform the routing functions according to this invention. Also maintained within memory 159 is an alternate list 162 whose purpose will be discussed in more detail later. As discussed briefly, edge system 114 as configured according to this invention can provide the capability of scaling dial-on-demand connections to alternate dial ports 150–153 within this edge system 114 or may negotiate with other edge systems to handle dial-on-demand routing calls as will be discussed in detail next.

Figure 3A:
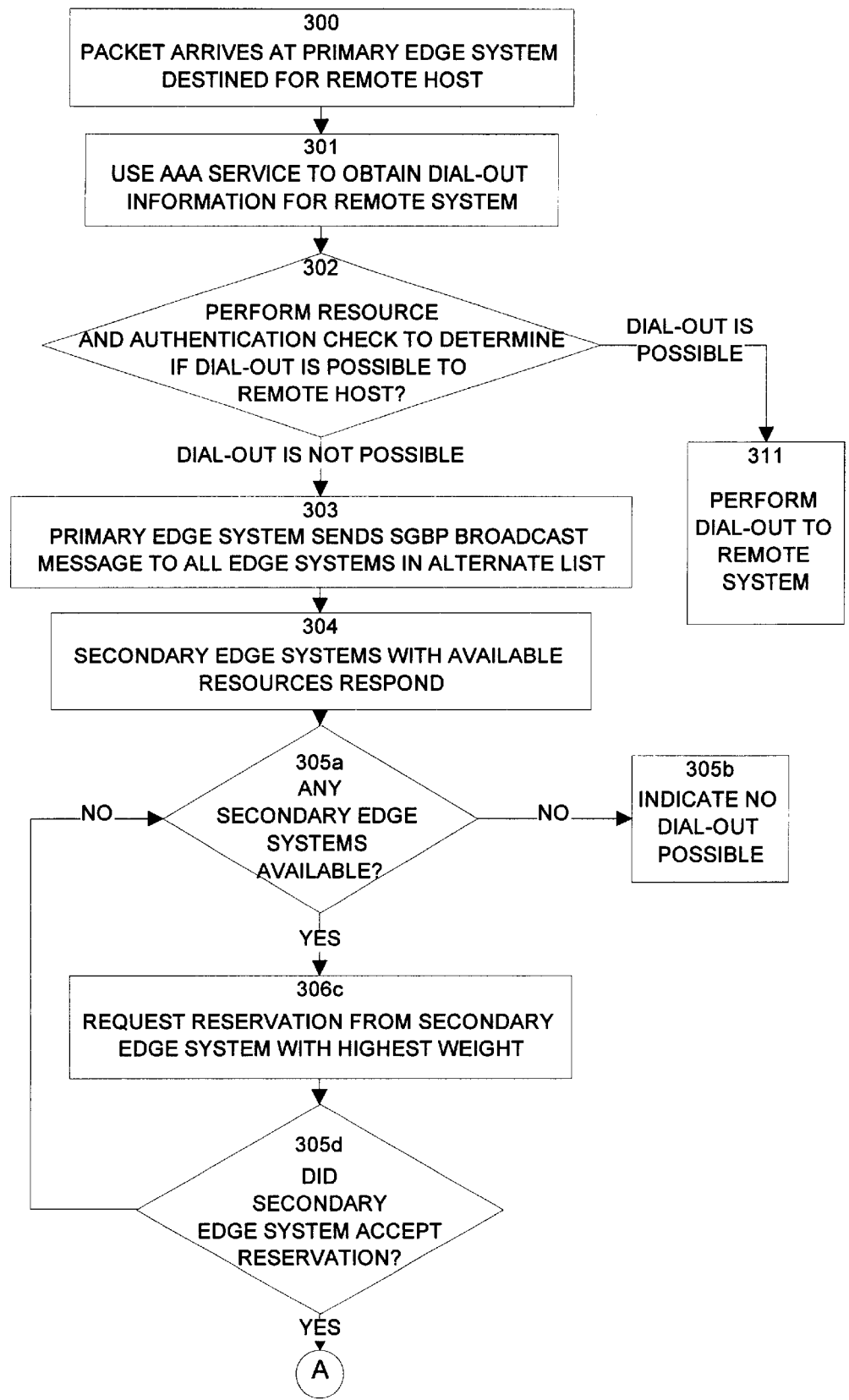
FIG. 3a and FIG. 3b illustrate a schematic data flow diagram showing the transfer of data through a data communications device configured to provide scaling dial-on-demand functionality according to this invention.
Figure 3B:
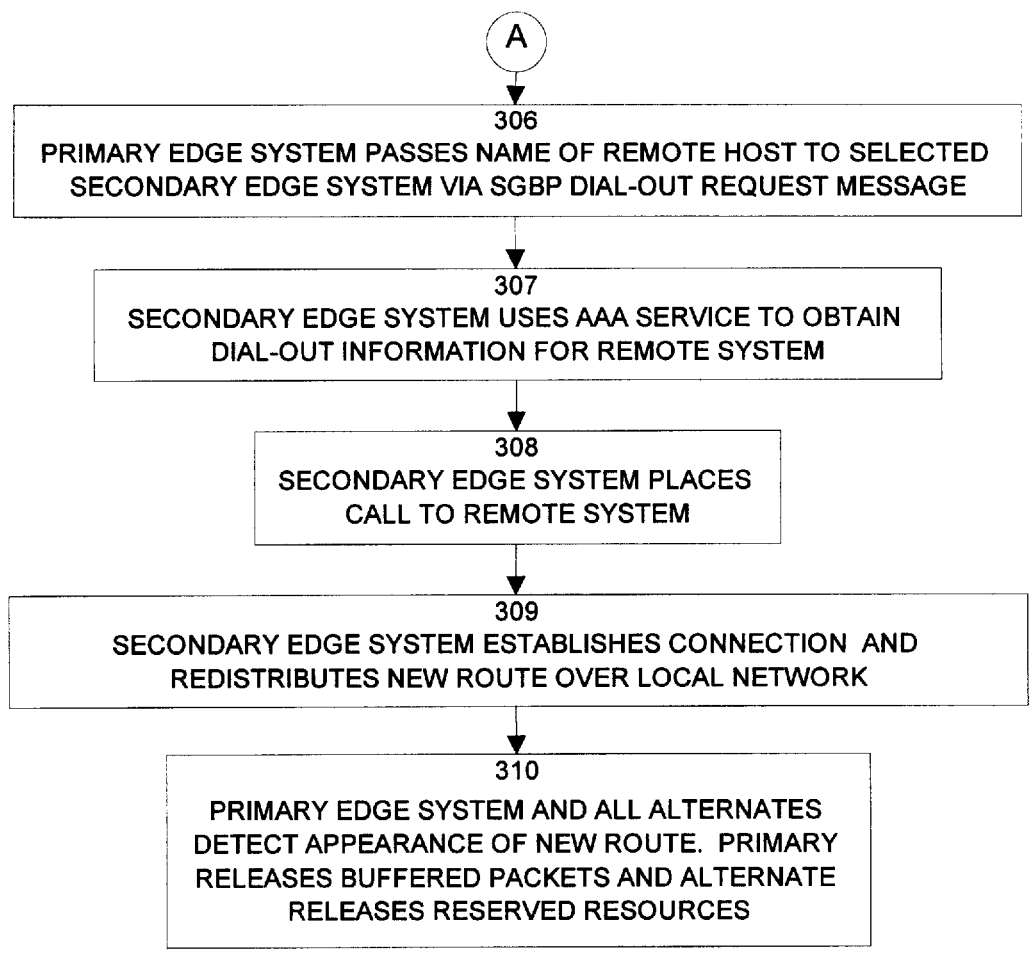

FIGS. 3a and 3b show the processing steps performed by the system of this invention according to a preferred embodiment. Steps 300 through 311 in FIGS. 3a and 3b are discussed in relation to primary and secondary edge systems. In this context, a primary edge system is a system in which a route to a remote system on a remote network is installed. That is, in a primary edge system, a route to a remote system such as remote system 102 is currently being advertised to other local systems 111–113 within local network 110. This, however, does not necessarily mean that a connection has yet been established to the remote system for which the primary edge system advertises a route. A secondary edge system in the context of FIGS. 3a and 3b is an edge system which does not yet advertise a route for a particular remote system of interest. For example, if edge system 114 is advertising the ability to create a dial-on-demand connection to remote system 102, this would be done by advertising a route to remote system 102 thus making edge system 114 a primary edge system. Edge systems 115 and 1116 would not typically be advertising the route to remote system 102 at the same time as edge system 114 and thus would be secondary edge systems. Thus for the context of FIG. 3, the primary edge system will be by way of example, edge system 114 while the secondary edge systems will be edge systems 115 and 116. Also for this example, the remote host or system will be remote host 102 within remote network 101.

According to this invention, in step 300, a packet of data that is destined for remote host 102 arrives from within local network 110 at the primary edge system 114. In step 301, the primary edge system 114 obtains information concerning the remote host 102 for which the packet is destined. Primary edge system 114 communicates with the authentication/authorization/accounting (AAA) server 109 to obtain the information concerning remote host 102 in step 301. The information obtained from the AAA server 109 includes such things as a phone number to dial in order to connect with remote system 102 as well as the name of the host of remote system 102. Other information obtained from AAA server 109 may include quality of service and maximum data rate levels for a connection to be established with remote system 102.

Once connection information is obtained concerning remote host 102, in step 302 the primary edge system performs a resource check and an authentication check (using information obtained from the AAA server 109) to determine if it is possible to dial out to remote host 102. Step 302 allows the primary edge system to check for various conditions such as congestion within the primary edge system 114 and over subscription in which case there are no dial ports 150–153 available. If a dial out is possible, step 311 is performed which causes a dial-out connection 120 (FIG. 1) to be established with remote host 102.

If, in step 302, a dial-out connection cannot be made from the primary edge system 114 due to congestion, over subscription, or another problem, step 303 is performed. In step 303, the primary edge system 114 sends a stack group bidding protocol (SGBP) broadcast message to all edge systems (i.e., edge systems 115, 116) maintained in the alternate list 162 (FIG. 1). The SGBP broadcast message is essentially a request sent out to other edge systems from the primary edge system in order to determine and select an alternate edge system which can make a dial-out connection to remote host 102. In a preferred embodiment, the alternate list 162 which is maintained in the edge system memory 159 contains a list of other edge systems 115, 116 within the same stack group of edge systems 117. That is, if a primary edge system such as edge system 114 is congested or oversubscribed, the SGBP broadcast message is sent to other edge systems within the same stack group 117. Alternatively, an SGBP-like broadcast message could be sent to edge systems located in entirely different locations or in other stack groups.

In step 304, each secondary edge system 115, 116 that receives the SGBP broadcast message and that has resources available to perform a dial-out connection to remote host 102 responds affirmatively to the SGBP broadcast message sent from the primary edge system 114.

In step 305a, the primary edge system receives the responses from each edge system 115, 116 which affirmatively responded to the SGBP broadcast message and determines if any secondary edge systems are available. In Step 305b, if it is determined that no secondary edge systems are available then an indication is made that no dial-out is possible. In Step 305c the primary edge server selects one of the responding secondary edge servers using a weighted selection criteria, the primary edge server then requests a resource reservation from the selected secondary edge server. In Step 305d the primary edge server determines if the selected secondary edge severs accepted the reservation, if it did, processing continues at Step 306, if the selected secondary edge sever rejected the reservation, processing resumes at Step 305a, where the next available secondary edge server with the highest weight is selected. As such, in steps 305a–305d the primary edge system selects one of the responding secondary edge systems 115, 116 which has the highest weight associated with it to be the dial-out edge system. That is, each edge system 115, 116 which responds to the SGBP broadcast message may have an associated weight. The weight of an edge system may be determined by various factors. For instance, if edge system 115 is capable of providing very high data rates, the weight of edge system 115 may be relatively high. Conversely, if edge system 116 can only provide modest data rates, its response to the primary edge system in step 304 may indicate a relatively modest weight.

Once the primary edge system 114 has selected a secondary edge system (e.g., edge system 115) as a secondary edge system, the primary edge system 114, in step 306, passes the name of the remote host 102 to the selected secondary edge system 115. Preferably, the name of the remote system 102 is passed from the primary edge system 1114 to the secondary edge system 115 via an SGBP dial-out request message. An SGBP dial-out request message is an additional message added to the SGBP protocol according to this invention. The SGBP dial-out request message essentially is a request sent from the primary edge system 114 to the secondary edge system 115 which instructs the secondary edge system 115 to set up and establish a dial-out connection with the remote host 102 as specified in the SGBP dial-out request message.

In step 307, the secondary edge system 115 can use the AAA server 109 to obtain the dial-out information for the remote system 102 for which the connection is to be established. In an alternative embodiment, it may be the case that the SGBP dial-out request message transmitted in step 306 can include the dial-out information for the remote system 102. Accordingly, step 307 may be an optional step included in an alternative embodiment.

In step 308, the secondary edge system 115 places a call to (i.e., dials the phone number of) the remote system 102. In step 309, the secondary edge system 115 establishes a connection with the remote system 102 and once established, creates a route in a routing table maintained by the secondary edge system 115. Also in step 309, the secondary edge system 115 redistributes the new route over the local network 110 so that other local systems such as 111, 112 and 113 are aware of the connection established from secondary edge system 115 to the remote system 102. Finally, in step 310, the primary edge system 114 detects the appearance of the new route distributed in step 309 and releases all buffered packets which are addressed for the remote system 102. In this manner, a primary edge system is able to select a secondary edge system which has the capability to establish a dial-out connection with a remote system at times when the primary edge system is not able to do so. Once the connection is established between the secondary edge system and the remote system, the primary edge system is able to release any buffered packets to prevent any packet loss within the data communication session.

According to another aspect of the invention, the system of the invention allows dial-out bandwidth-on-demand to be accomplished. As an example, if edge system 114 is currently using an established dial-out connection 120 to communicate with remote system 102 but requires more bandwidth, the invention allows edge system 114 to create additional connections with remote system 102. The additional connections may be created completely within or upon edge system 114, or alternatively, may be created with the use of additional edge systems such as 115 or 116. Bandwidth-on-demand using dial out from local network 110 to remote network 101 allows remote system 102 to not be concerned with having to maintain a prescribed amount of bandwidth. Rather, bandwidth-on-demand as provided by the invention allows bandwidth from local network 110 to remote network 101 to be scaled as needed based upon data transmission requirements of local hosts within local network 110.

In an alternative embodiment for secondary edge system selection, the secondary edge systems 115, 116 each receive the SGBP broadcast message and reserve resources in order to perform the dial out should they be selected as the secondary edge system of choice. When secondary edge systems detect the appearance of the new route to the remote system 102 they can then release the reserved dial-out resources.

Figure 4:
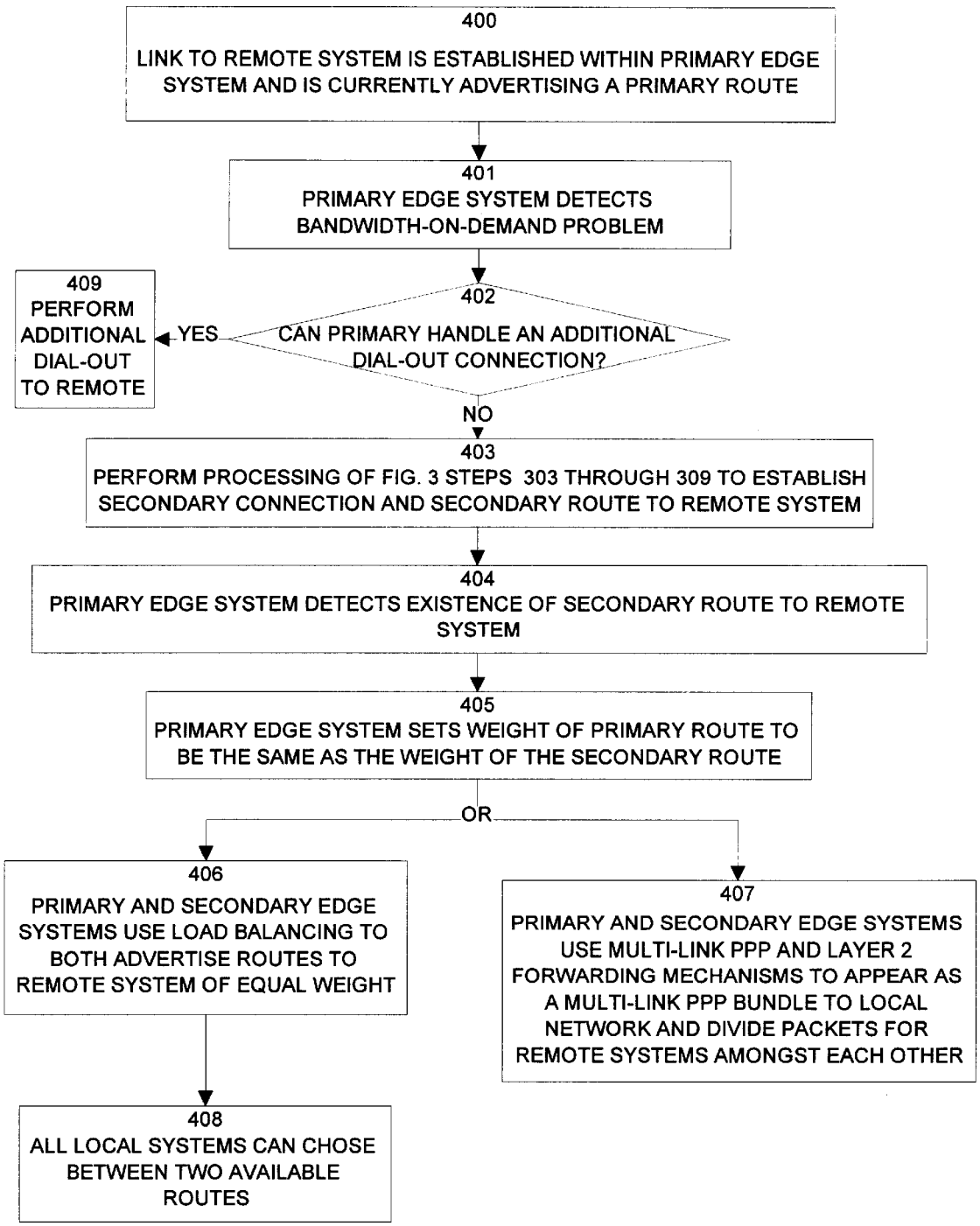
FIG. 4 illustrates a schematic data flow diagram showing the transfer of data through a data communications device configured to provide scaling bandwidth-on-demand functionality according to this invention.

FIG. 4 illustrates the processing steps provided by an edge system configured according to the invention to provide scaling bandwidth-on-demand capabilities. In step 400, a communications link 120 (FIG. 1) to remote system 102 is established within primary edge system 114. Also, primary edge system 114 is currently advertising a primary route through itself to remote system 102 on local network 110. That is, after step 400, connection 120 exists and edge system 114 is advertising the route via connection 120 to remote system 102.

In step 401, as data packets are being transmitted over connection 120 to remote system 102, the primary edge system 114 detects a bandwidth-on-demand problem. That is, the primary edge system 114 detects that the bandwidth capabilities of the connection 120 are being used beyond a maximum prescribed density. As such, according to this invention, the primary edge system 114 can establish one or more secondary connections with remote system 102.

To do so, the primary edge system, in step 402, determines if it can handle an additional dial-out connection to remote system 102. The processing in step 402 may, for instance determine if there are any dial-out ports 150–153 available to create a dial-out connection to remote system 102. If there are dial-out ports 150–153 available and if the edge system 114 is not congested, step 409 is processed to perform the creation of an additional dial-out connection to remote system 102.

However, if the primary edge system 114 determines in step 402 that a dial-out connection to remote system 102 cannot be created within the primary edge system 114 itself, step 403 is processed. In step 403, the processing steps 303 through 309 of FIG. 3 are performed which establish a secondary connection and a secondary route to remote system 102 through one of the alternate edge systems 115, 116. That is, the processing of step 403 is identical to that described above with respect to steps 303 through 309 of FIG. 3. Accordingly, after step 403, a secondary connection 121 is established with remote system 102 from the secondary edge system 115. Note that step 310 from FIG. 3 is not executed in step 403 of FIG. 4.

In step 404, the primary edge system 114 detects the existence of the secondary route to the remote system 102 as broadcast by the secondary edge system 115. In step 405, the primary edge system 114 sets a weight of the primary route (e.g., connection 120 to remote system 102) to be the same as the weight of the secondary route (e.g., connection 121 to remote system 102). That is, in step 405, once the primary edge system 114 has detected the presence or existence of the secondary connection 121, the primary edge system 114 sets the weight of the pre-existing connection 120 to have the same weight as the secondary connection 121. In this manner, step 405 allows each connection 120 and 121 to the remote system 102 to have the same weight within local network 110.

After step 405, either one of steps 406 or 407 may be performed, where each is an alternative embodiment of the invention. In step 406, the primary and secondary edge systems 114 and 115 which are each maintaining respective connections 120 and 121 to remote system 102 each use a load balancing technique to advertise the routes for connections 120 and 121 to local systems within local network 110. That is, in step 406, a load balancing technique is used by any local hosts, such as local systems 111–113, in order to determine which of the two possible routes through either edge system 114 or 115 that may be used to transmit data to remote system 102.

A preferred embodiment of the invention proceeds according to step 407 in which the primary and secondary edge systems 114 and 115 use a technique known as multi-link PPP and layer 2 forwarding mechanisms to appear to all local systems 111–113 on local network 110 as a multi-link PPP bundle. That is, since edge system 114 and 115 both maintain a connection to remote system 102, according to step 407, the edge systems 114 and 115 use multi-link PPP methods and layer 2 forwarding mechanisms which are known in the art, to appear as a multi-link PPP bundle to local network 110.

Typically, multi-link PPP bundles are only used in the prior art systems to allow edge systems to offer multi-link connection services for dial-in services only. That is, if a remote system such as remote system 102 needed an additional dial-in connection to local network 110, remote system 102 could use prior art multi-link PPP bundling techniques to add additional dial-in connections. The present uses known multi-link PPP bundling technologies in conjunction with layer 2 forwarding mechanisms to offer a service which is unique to this invention. The unique service being that the edge systems 114 and 115, which each maintain dial-out connections, can offer the dial-out connections as a multi-link PPP bundle to hosts dialing out from local network 110. When packets arrive to the multi-link PPP bundle, it is a responsibility of the layer 2 forwarding mechanisms to divide the packets for the remote system 102 amongst each edge system 114 and 115. Step 407 is a preferred embodiment of the invention as contrasted with step 406 which is an alternative mechanism to allow both connections 120 and 121 to be used to access remote system 102.

For embodiments implementing Step 406, Step 408 follows, in which all local systems such as local systems 111–113 within local network 110 can choose between the two available advertised routes using either per packet or per destination techniques.

In this manner, processing steps 400–409 allow the present invention to offer bandwidth-on-demand features for packets which must be transferred from local network 110 via dial-out connections to a remote network such as remote network 101.

According to another aspect of the invention, the system of the invention can assist systems which use a feature called "call back". Generally, call back refers to a system in which a remote system such as remote system 102 places a call to an edge system such as edge system 114. When the edge system 114 answers the call from remote system 102, remote system 102 identifies itself to edge system 114 and then hangs up. Edge system 114 then uses a mechanism such as caller identification or uses the AAA server 109 to obtain dialing information for the remote system 102 which just dialed in. Once this information is obtained, the edge system 114 calls back the remote system 102 and establishes a data communications session therewith. This call back process is known in the prior art and is simply used to place the primary calling responsibility onto the edge system 114 rather than the remote system 102. That is, the remote system 102 simply places a quick short call to the edge system 114 to identify itself and then disconnects the connection. Immediately thereafter, the edge system 114 calls the remote system 102 back and establishes a data communications connection which may last for any length of time thereafter. In this manner, the prior art call back systems simply place the majority of the phone call cost on the edge system 114. This is useful, for example, within companies which require traveling sales people to dial in to an edge system within the corporate network from anywhere in the country and which want to maintain phone bills which are predominantly charged from a single edge system, rather than having each sales person dial in for an indefinite amount of time while communicating with the company's computer network.

The system of the invention assists in systems which use the call back feature in that if the initial call placed by the remote system 102 is placed and answered by an edge system 114 which may be congested or oversubscribed, the system of the invention can pass off the call back responsibility to another edge system which may be less congested or may be less subscribed. That is, the invention as previously described allows an edge system which is aware of a requirement for a connection to be placed to a remote system to pass off this requirement and the connection establishment responsibility to another edge system. As such, in a call back situation, when a remote system 102 dials in, any edge system 1114, 115 or 116 may answer the call, regardless of its current congestion or subscription rate. However, before the edge system which accepted the initial call from the remote system 102 places a return call, the edge system uses the invention to determine if the capability exists within itself to place the return call. If not, the invention allows the edge system to transfer the call responsibility to another edge system.

Various conditions may exist within an edge system which cause that edge system to pass off call responsibility to another edge system. In one situation, the edge system may simply be congested and may not have enough processing power to handle additional dial-out capabilities. An over subscription condition may occur in which the edge system which answered the dial-in call contains no dial-out ports available to place the return call to the remote system.

Another condition which may trigger a dial-out call handoff is that the class of the remote system 102 which makes the initial dial-in attempt may be low. That is, remote system 102 which makes the initial dial-in connection may only have an associated level of service for a low speed connection. However, the edge system which may have happened to answer the call may only provide dial-out connections of a very high speed or high data rate. As such, the edge system which answered the call can use the invention to cause another edge system which handles lower priority remote system call backs to perform the dial-out call back connection.

Another selection criteria which may trigger use of the invention in a call back scenario is based on the cost of the return call back. As an example, suppose a single edge system is provided with an 800 number which may be used nationwide for any remote system to perform the initial dial-in step. When the initial dial-in step is performed from anywhere in the country, the single 800 number associated with the edge system answers the call. The edge system uses a mechanism such as caller ID to determine the exact geographical location of the remote system 102 based on area code, for example. Once the geographical location of the remote system requesting a call back is known, the edge system which answered the call can direct an edge system located within close proximity to the remote system awaiting a call back to make the call back. In this manner, no matter which geographical location a remote system calls in from, the system of the invention can ensure that a call back to that remote system is made from an edge system which is located as close as possible to the remote system in order to minimize call back costs.

While this invention has been described as allowing an edge system within a single stack group 117 to provoke other edge systems within the same stack group to place dial-out calls, the invention is not limited as such. That is, if edge system 114 in stack group 117 is congested, oversubscribed or requires more bandwidth-on-demand, the edge system 114 may select other edge systems in other stack groups which are not shown in FIG. 1 to be the secondary edge systems which place the dial-out call to the remote system. The alternate list 162 shown in FIG. 2 may maintain a list of edge systems either within a single stack group or within an entire local network 110 which may be used for transmission of the SGBP dial-out request message (i.e., step 306 in FIG. 3).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An edge network access server providing scalable dial-out routing of a network packet which comprises:
   a system processor;
   a system memory containing:
      a router module for routing the network packet to alternate edge network access servers, the alternate edge network access servers providing physical port assignment of the network packet the router module including:

a detector for detecting the arrival of the network packet;

an information access module for obtaining dial-out information from an authentication/authorization/accounting server for the remote host system addressed by the network packet, the dial-out information including a phone number for connecting to the remote host system; and a list of alternate edge network access servers;

local communication ports for interfacing to a local host system; and a system bus connecting the system processor, the system memory and the local communication ports.

2. The edge network access server of claim 1 further comprising:

dial communication ports for creating dial connections to the remote host system, the dial communication ports being connected to the system bus.

3. The edge network access server of claim 2 wherein the router module includes:

an evaluator for determining if the edge network access server has capacity to dial-out to the addressed remote host system;

a dial-out module for dialing-out to the addressed remote host system, the router module sending the network packet to the addressed remote host system, if capacity exists; and a buffer module to buffer the network packet, a selector for selecting an alternate edge network access server, the router module sending the network packet to the addressed remote host system, if capacity does not exist.

4. The edge network access server of claim 3 wherein the information access module further includes:

an interface to the authentication/authorization/accounting server.

5. The edge network access server of claim 3 wherein the information access module further includes:

an interface to a network directory server.

6. The edge network access server of claim 3 wherein:

the capacity further includes over-subscription capacity, defined as the edge network access server having no available dial-out ports, and congestion capacity, defined as the edge network access server having no available resources for dial-out; and the selector further includes a terminator for terminating a current route to the edge network access server.

7. The edge network access server of claim 6 where:

the dial communication ports receive an incoming call;

the evaluator determines capacity to handle the incoming call based upon: over-subscription of the dial communication ports, congestion of the edge network access server, the service level of the dial communication ports available, and the cost of using the dial communication ports available; and the dial communication ports place a dial-out call back to the source of the incoming call.

8. The edge network access server of claim 3 wherein:

the capacity further includes band-width capacity, defined as the edge network access server needing more dial-out capacity to satisfy a predetermined level or dial-out service; and the distributor for distributing new routing information for a secondary edge network access server setting a weight for the route to the secondary edge network access server equal to the weight for the route to the edge network access server.

9. The edge network access server of claim 8 wherein the distributor instructs edge network access servers to use load balancing to advertise their routes.

10. The edge network access server of claim 8 wherein the distributor instructs edge network access servers to use multi-link PPP and layer 2 forwarding mechanisms to present appearance of a multi-link PPP bundle to advertise their routes.

11. An edge network access server providing scalable dial-on-demand routing of a network packet which comprises:

a system processor;

a system memory containing:

a router module for routing the network packet to alternate edge network access servers; and a list of alternate edge network access servers;

local communication ports for interfacing to a local host system;

a system bus connecting the system processor, the system memory and the local communication ports; and dial communication ports for creating dial connections to a remote host system, the dial communication ports being connected to the system bus; wherein the router module includes:

a detector for detecting the arrival of the network packet;

an information access module for obtaining dial-out information for the remote host system addressed by the network packet;

an evaluator for determining if the edge network access server has capacity to dial-out to the addressed remote host system;

a dial-out module for dialing-out to the addressed remote host system, the router module sending the network packet to the addressed remote host system, if capacity exists; and a buffer module to buffer the network packet, a selector for selecting an alternate edge network access server, the router module sending the network packet to the addressed remote host system, if capacity does not exist; wherein the selector further includes:

a broadcaster for broadcasting a stack group bidding protocol message to all edge network access servers on the list of alternate edge network access servers;

a receiver for receiving the stack group bidding protocol message from one of alternate edge network access servers on the list of alternate edge network access servers, the stack group bidding protocol message indicating whether the alternate edge network access server has dial-out capacity, a weight associated with the dial-out capacity and an indication that the alternate edge network access server has reserved resources for the dial-out capacity;

a weigh-based selector for selecting the alternate edge network access server associated with the stack group bidding protocol message having the highest weight as a secondary edge network access server;

a distributor for distributing new routing information for the secondary edge network access server to network access servers; and a releaser for releasing the resources reserved for the dial-out capacity.

12. A method of providing scalable dial-out routing of a network packet to a remote system comprising the steps of:

(a) receiving a network packet on an edge network access server, from a local host system;

(b) obtaining dial-out information for the remote host system addressed by the network packet by communicating with an authentication/authorization/accounting server, the dial-out information including a phone number for connecting to the remote host system;

(c) determining if the edge network access server has capacity to dial-out to the addressed remote host system;

(d) providing a physical port assignment of the network packet, dialing-out to the addressed remote host system and routing the network packet to the addressed remote host system, if capacity exists; and (e) buffering the network packet, selecting an alternate edge network access server, and routing the buffered network packet to the selected alternate edge network access server using a list of alternate edge network access servers, if capacity does not exist.

13. The method of claim 12 wherein determining if the edge network access server has capacity further includes the steps of:

(a) identifying over-subscription capacity, defined as the edge network access server having no available dial-out ports, and congestion capacity, defined as the edge network access server having no available resources for dial-out; and (b) terminating a current route to the edge network access server.

14. The method of claim 13 further including the steps of:

(a) receiving an incoming call;

(b) determining the capacity to handle the incoming call based upon: over-subscription of the dial communication ports, congestion of the edge network access server, service level of the dial communication ports available, and cost of using the dial communication ports available; and (c) placing a dial-out call back to the source of the incoming call.

15. The method of claim 12 wherein the step of determining if the edge network access server has capacity further includes:

(a) determining band-width capacity, defined as an edge network access server needing more dial-out capacity to satisfy a predetermined level of dial-out service; and (b) distributing new routing information for a secondary edge network access server setting a weight for the route to the secondary edge network access server equal to the weight for the route to the edge network access server.

16. An article of manufacture comprising a computer usable medium having computer readable program code means embodied therein for:

(a) receiving a network packet on an edge network access server, from a local host system;

(b) obtaining dial-out information for a remote host system addressed by the network packet by communicating with an authentication/authorization/accounting server, the dial-out information including a phone number for connecting to the remote host system;

(c) determining if the edge network access server has capacity to dial-out to the remote host system;

(d) providing a physical port assignment of the network packet, dialing-out to the remote host system and routing the network packet to the remote host system, if capacity exists; and (e) buffering the network packet, selecting an alternate edge network access server, and routing the buffered network packet to the selected alternate edge network access server using a list of alternate edge network access servers, if capacity does not exist.

17. A computer data signal embodied in a carrier wave comprising a code segment for:

(a) receiving a network packet on an edge network access server, from a local host system;

(b) obtaining dial-out information for a remote host system addressed by the network packet by communicating with an authentication/authorization/accounting server, the dial-out information including a phone number for connecting to the remote host system;

(c) determining if the edge network access server has capacity to dial-out to the remote host system;

(d) providing a physical port assignment of the network packet, dialing-out to the remote host system and routing the network packet to the remote host system, if capacity exists; and (e) buffering the network packet, selecting an alternate edge network access server, and routing the buffered network packet to the selected alternate edge network access server using a list of alternate edge network access servers, if capacity does not exist.

* * * * *